3,701,628
TREATMENT OF SURFACE WITH LOW-PRESSURE PLASMAS
Leland E. Ashman, Belmont, and Wilson P. Menashi, Lexington, Mass., assignors to Arthur D. Little, Inc., Cambridge, Mass.
Filed Feb. 25, 1970, Ser. No. 14,083
Int. Cl. A61l 1/00
U.S. Cl. 21—54 R                                           6 Claims

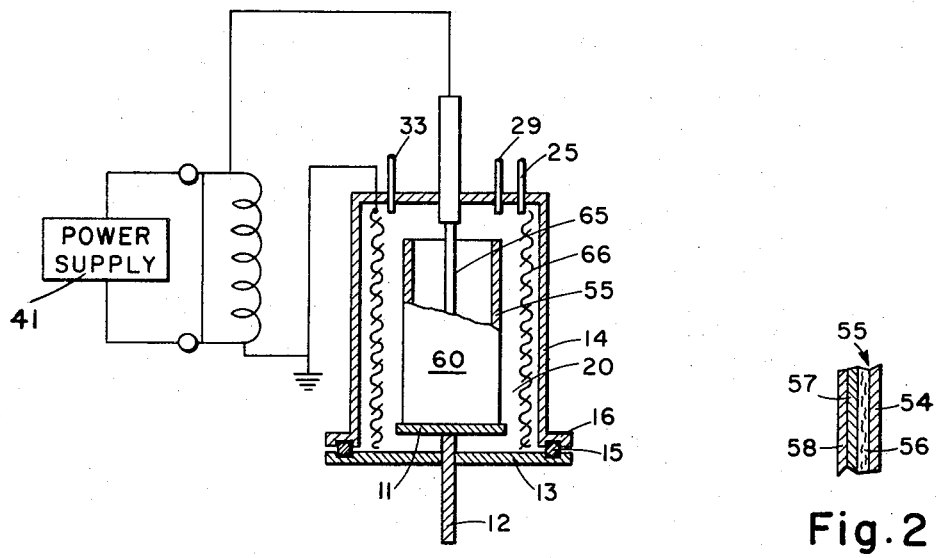
Fig. 3
Fig. 2
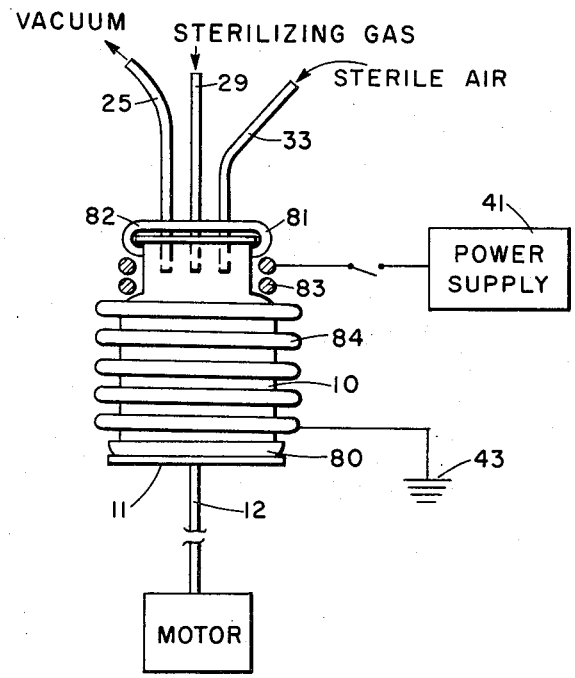
Fig. 4
Leland E. Ashman
Wilson P. Menashi
INVENTORS

United States Patent Office 3,701,628
Patented Oct. 31, 1972

ABSTRACT OF THE DISCLOSURE

Method and apparatus for sterilizing surfaces which cannot tolerate intensive heating or which, if heated, must be brought up to temperature and then cooled over an extended period of time. Sterilization is accomplished by exposing the surface to a low-pressure plasma of a sterilizing gas such as chlorine, bromine or iodine.

---

This invention relates to the treatment of surfaces, and more particularly to the treatment of surfaces of materials which are not amentable to induction heating, such as glass, plastics and ceramics, to render them sterile, i.e., free from microorganisms.

A wide variety of pharmaceuticals, foodstuffs, and beverages are dispensed in glass or plastic containers, and in many cases it is necessary that the surfaces of these containers which are to come in contact with the material contained be sterile or free from any microorganisms such as bacteria and the like. Heating such containers to a temperature which is sufficient to destroy the microorganisms is the general technique used in sterilizing. In the case of glass containers it is desirable, for the sake of economy, to use the cheapest grades of glass. These cheap glasses usually have thermodynamic properties and coefficients of thermal expansion which do not permit rapid heating and cooling. This in turn means that in order to sterilize ordinary glass containers, or even those formed of some of the more expensive grades of glass, it is necessary to slowly heat and then slowly cool them to effect the sterilization. Since it is impractical in a large-scale filling operation to handle each container in this manner individually, it is customary to sterilize a large quantity of containers at one time. This in turn requires that the glass containers then be stored under completely sterile conditions until they can be filled.

Many plastic materials do not have melting points which permit the intensive heat sterilization which could make them usable as sterile containers. Those plastics that can be heat sterilized require heating over a period of time and then slow subsequent cooling. Although the problem of the coefficient of thermal expansion in plastics may not be so marked as in the case of glass, careful cooling must be accomplished and these plastic containers must be maintained under sterile conditions until filled. Problems similar to those encountered with glass arise in the case of ceramic articles.

Sterilization is also, of course, done chemically such as through the use of ethylene oxide, chlorine, peroxides and the like. Some of these chemicals are hazardous to use and some are not always reliable.

Although some filling processes will permit hot filling many will not, thus necessitating having cool containers for filling. For example, many pharmaceuticals can neither be heated for filling or tolerate introduction in hot containers; and many foodstuffs would be overcooked if it were necessary to keep them hot for filling.

Inasmuch as materials such as glass, plastics and ceramics are not electrically conducting they do not lend themselves to induction heating, and dielectric heating is impractical for a surface treatment. Recently a new method for sterilizing surfaces of materials which do not conduct electricity and which have relatively low thermal conductivity (e.g., glass, plastics, etc.) was disclosed in U.S. Pat. 3,383,163. This method comprises contacting the surface to be sterilized with a gaseous pulsed plasma at extremely high temperatures for a period of time which is less than that required to effect any appreciable physical change in the surface but sufficient to destroy any microorganisms on the surface. This time of contact by this prior art method of plasma sterilization is usually less than one second and normally less than one-tenth of a second. The method which relies primarily on a momentary flash of intense heat to kill the microorganisms is effective, but it requires very accurate timing control to prevent overheating and the descruction of the surface by the creation of hot spots. Moreover, the creation of a very short-duration pulsed induction plasma such as required by the method of U.S. Pat. 3,383,163 requires a large amount of electrical power.

The use of a plasma for sterilization has a number of important advantages over the slow heating-slow cooling procedure. One of these advantages lies in the fact that the sterilizing of the interior of containers for example may be made an additional step in and integral with the container filling procedure, thus eliminating, if desired, the need for batch sterilization and the storing and handling of the containers of such a batch under sterile conditions until filled. It would therefore be desirable to have an improved method of plasma sterilization which was free from the criticality of exposure time and which required less exacting control.

It is therefore a primary object of this invention to provide an improved method of using a plasma to sterilize surfaces of glass, plastics, ceramics and like materials to render them free of microorganisms. It is another object of this invention to provide a method of plasma sterilization which employs a plasma which is more easily controlled and which does not require as much power as the prior art plasma sterilization. It is yet another object of this invention to provide a method of sterilizing containers which can be incorporated into a container filling assembly line in a manner so that the containers may be sterilized immediately prior to filling, thus eliminating the necessity for storing them under sterile conditions until they can be filled.

It is another object of this invention to provide apparatus for plasma sterilizing surfaces of glass, plastics and ceramics. It is still another object of this invention to provide apparatus of the character described which can be incorporated into a filling assembly line and made an integral part thereof. Other objects of the invention will in part be obvious and will in part be apparent hereinafter.

The invention accordingly comprises the several steps and the relation of one or more of such steps with respect to each of the others, and the apparatus embodying features of construction, combinations of elements and arrangements of parts which are adapted to effect such steps, all as exemplified in the following detailed description, and the scope of the invention will be indicated in the claims.

For a fuller understanding of the nature and objects of the invention, reference should be had to the following detailed description taken in connection with the accompanying drawings in which:

FIG. 2 is a fragmentary cross section of the wall of a metal foil-lined container;

Figure 1:
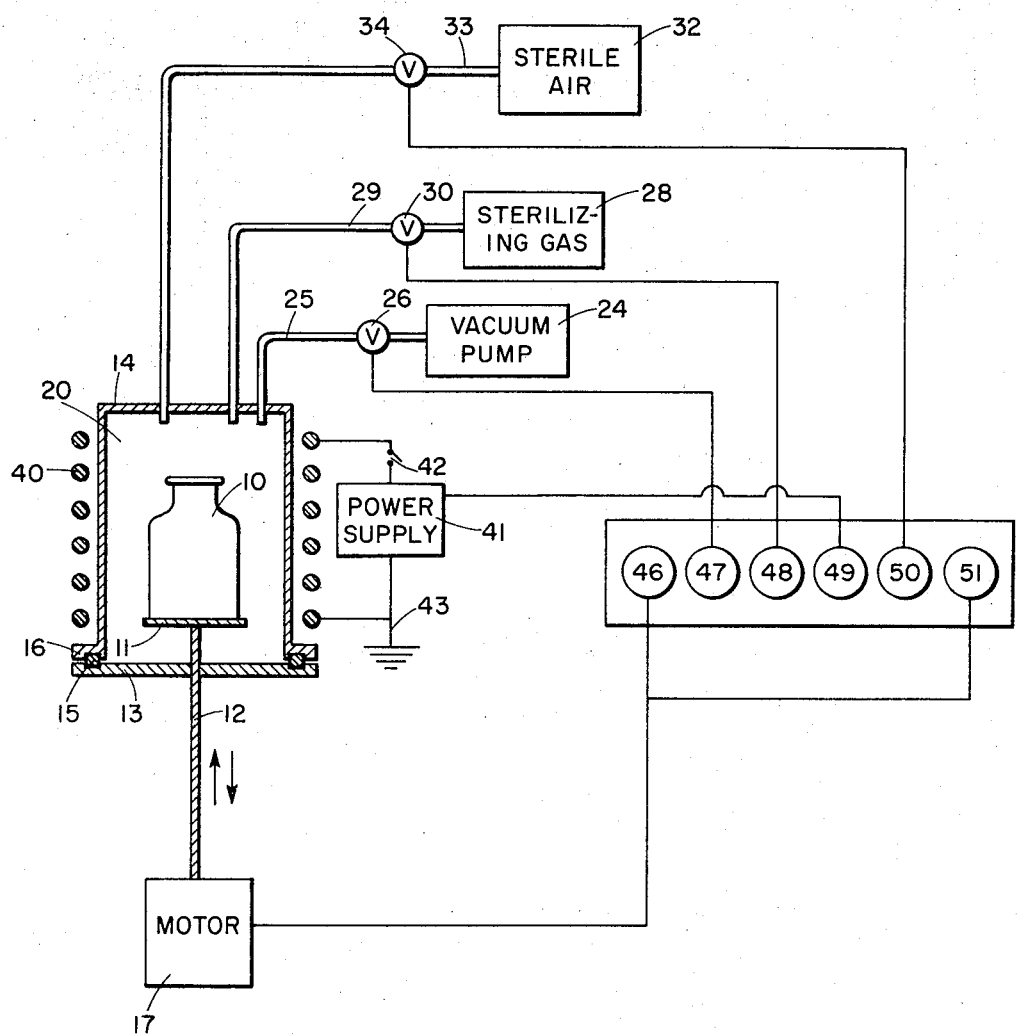
FIG. 1 is a diagrammatic representation of the apparatus of this invention designed to sterilize the surfaces of a glass or plastic container.

FIG. 3 is a diagrammatic representation of the apparatus of this invention designed to sterilize the inner surface of a container formed of a laminated material, one of the laminae being formed of an electrically conducting material as shown in FIG. 2; and FIG. 4 is a modification of the apparatus of FIG. 1 wherein the plasma is developed entirely within a container, the inner surface of which is to be sterilized.

The method of this invention may be characterized as the contacting of the surface to be sterilized with a low-pressure gaseous plasma containing between about 10 and 90% by weight of a sterilizing gas in ionic form. The use of a low-pressure plasma of a sterilizing gas materially reduces the temperature below that at which plasma sterilization is accomplished by the method of U.S. Pat. 3,383,163. This in turn means that the exposure time may be as long as is necessary completely to destroy the microorganisms on the surface to be sterilized. It also means that timing control is not critical or difficult to achieve. The net result is a thoroughly sterilized surface free from any damage and achieved at a considerably lower expediture of power.

The apparatus of this invention may be defined as requiring means to reduce the pressure of the gaseous medium in contact with the surface to be sterilized, means to supply a controlled amount of a sterilizing gas to the surface and means to ionize the sterilizing gas. The surface to be sterilized may be placed in a fluid-tight chamber; or if the surface is the inner wall of a container, the container may be sealed and serve as a fluid-tight chamber. The apparatus may, if desired, include automatic control means to automatically actuate the apparatus components in a desired sequence.

FIG. 1 is a simplified, somewhat diagrammatic represenation of an apparatus constructed in accordance with and operating according to the method of this invention.

A container 10, such as a plastic or glass bottle, is to be sterilized inside and out in the apparatus embodiment of FIG. 1. (It will of course be recognized that any desired number of such bottles or any other surfaces to be sterilized may be processed in this apparatus.) For convenience the bottle 10 is positioned on a platform 11 supported on a shaft 12 which is affixed in any suitable manner to a bottom piece 13 of a chamber-defining housing 14. Alternatively, the bottle may rest directly on the bottom piece 13. A suitable sealing means such as sealing ring 15 is positioned between the bottom piece 13 and a flange 16 associated with the lower end of housing 14. The shaft 12 is movable in the directions indicated by the arrows and is driven up and down by motor 17. When the bottom piece 13 is brought to its uppermost position and a seal is made with flange 16, a vacuum-tight chamber 20 is formed.

A vacuum pump 24 is connected with chamber 20 through conduit 25 which may have a valve 26. In like manner a source 28 of sterilizing gas (e.g., chlorine) is connected to chamber 20 through conduit 29 having valve 30; and a source 32 of sterile air is connected through conduit 33 having valve 34.

The housing 14 is formed of an electrically nonconducting material such as glass, and a R–F coil 40 is positioned around it. A power supply 41, such as a high-voltage R–F oscillator is connected through switch 42 to the coil 40 and to ground 43.

Although the apparatus may be operated by hand, it may be desirable to incorporate automatic control as illustrated schematically in FIG. 1. Such automatic actuation systems are well known in the art; and any mechanism capable of automatically operating the various apparatus components in a predetermined timed sequence may be used. As an example, assume a timing mechanism associated with suitable switching means capable of actuating valves 26, 30, and 34, switch 42 and motor 17. Assume that the bottle 10 is placed on platform 11 when bottom member 13 is in its lower-most position. The cycle is then ready to begin and the timing mechanism actuates control 46 which causes motor 17 to raise bottom member 13 until a vacuum-tight seal is formed and chamber 20 is in condition for evacuation. Then control 47 actuates vacuum pump 24 and opens valve 26, this condition being maintained until the pressure in chamber 20 has reached the desired level. Control 47 then closes valve 26 and turns off vacuum pump 24. Then control 48 opens valve 30 to permit introduction of a predetermined amount of the sterilizing gas into chamber 20 before the valve is closed. Then control 49 actuates switch 42 to deliver power to the R–F coils for the desired period and then reopens the switch to cut off the power and the plasma. Control 50 then opens valve 34 to let in sterile air or other sterile gas to bring the pressure up to ambient and then closes the valve. Finally, control 51 actuates motor 17 to cause it to lower bottom member 13 so that the bottle 10 may be removed. This then completes the cycle and the steps of the method of this invention.

It may be desirable to sterilize containers which are formed of a laminated material, one of the laminae being an electrical conductor. An example of such a container is a milk carton which is typically formed as shown in FIG. 2 of a laminate 55 comprising, from outside in, layers of wax 54, paper 56, metal foil 57 and wax 58. FIG. 3 illustrates an apparatus modification particularly suited for sterilizing the interior walls of such a container 60. In this apparatus like reference numerals are used to refer to like components in FIG. 1. The R–F field required to ionize the low-pressure sterilizing gas in chamber 20 is generated by means of an electrode 65 which extends down into the container 60, a screen electrode 66 and an associated power supply 41 which may be for example a suitable loaded, plate-tuned grid R–F oscillator with output signal coupled to the apparatus as shown. If housing 14 is metal and electrically conducting it may serve as one electrode and screen electrode 66 may be omitted.

If the surface to be sterilized is the inner wall of a vessel or bottle, it is possible to use the volume within the bottle as the chamber to be evacuated, provided, of course, that the bottle can be suitably sealed to make it fluid-tight for evacuation. An apparatus embodiment which is designed to perform in this manner is shown in FIG. 4 in which like reference numerals refer to like components in FIGS. 1 and 3. The bottle, the interior wall of which is to be sterilized, is gripped firmly along its lower edge by some suitable device such as a friction fitting ring 80; and as it is moved upwardly into sterilizing position it is sealed by a snap ring 81 which may be of an elastomeric material or covered with it. The snap ring 81 is a part of a closure member 82 which has conduits 25, 29 and 33 passing through it and sealed thereto. This closure may be movable and the platform 11 stationary if desired, this latter arrangement being suited to bottles which have a uniform diameter throughout their length. In FIG. 4, the coil is wound to have an upper section 83 of smaller diameter than the lower section 84 to conform to the shape of bottle 10.

Automatic or hand control of the timed sequence of events may be used for the apparatus of FIG. 3 and of FIG. 4 in the same manner as described in conjunction with FIG. 1.

The atmosphere surrounding the surface to be sterilized, i.e., chamber 20 of FIGS. 1 and 3 or the interior of the bottle 10 of FIG. 4, should be pumped down to about one-tenth to one mm. Hg, about 0.5 mm. being a typical pressure. The amount of sterilizing gas introduced should be sufficient to create a pressure of between about one and ten mm. Hg and amount to between about 10 and 90% by weight of the gases contained in the chamber or bottle. The duration of the application of the R-F field which ionizes the sterilizing gas is dependent upon the amount of sterilizing gas present, the pressure of the gases and the intensity and frequency of the R-F field. Because the temperature of the gas is relatively low, compared with an induction plasma formed in gases at atmospheric pressure, there is little danger of destroying the surface to be sterilized and precise timing of plasma duration is less critical. Sterilization is normally accomplished in a few seconds.

The power required to generate the R-F field will be determined by the quality and quantity of sterilizing gas used and by the geometry of the volume in which the R-F field is to be generated. Generally, voltages between about 500 and 5,000 volts will be used. The frequency of the R-F field may range from about one to ten megacycles. In general, it is desirable to use higher frequencies with higher pressures. It is usually preferable to use these higher pressures and higher frequencies so long as they are compatible with the other operational parameters chosen. These operational parameters which are time, pressure, voltage, geometry, etc., are however, all interrelated and can readily be determined for any desired system.

The ionizable sterilizing gas will generally be chlorine; bromine or iodine, chlorine being the preferred gas. In order to break the vacuum and then be able to handle the sterilized surface it will generally be desirable to surround it with sterile air or some other suitable sterile gas until the surface is properly sealed in, such as by filling and then closing and sealing a milk carton, or packaging a sterilized instrument.

The method of this invention may be further described in an example which is meant to be illustrative and not limiting.

Twenty plastic one-pint bottles such as in FIG. 1 were inoculated on their inner and outer surfaces with PSO spores at a density of about 1,000 spores per square inch of surface area. Ten of these containers were placed in a chamber; it was evacuated to about one-tenth mm. Hg and then chlorine was introduced to give a pressure of two mm. Hg. An R-F field was generated using 1,000 volts and a frequency of six megacycles, and the chlorine plasma thus formed was maintained for about 3 seconds to expose the containers inside and out to the glowing ionized chlorine gas. After introduction of sterile air the containers were removed and their surfaces were sprayed with an agar culture medium.

As a control, the other ten bottles were exposed to chlorine vapor at a similar pressure for a period of one hour and then treated with the agar culture medium.

The agar cultures were incubated for 36 hours at a temperature of 35° C. and then examined. Those removed from the plasma-sterilized surface showed that the spores were totally killed while those removed from the cartons soaked in chlorine vapor were swarming with spore colonies. Substitution of iodine or bromine for the chlorine gave similar results. HCl gas was effective, but not as potent as the chlorine ions derived from chlorine gas. Plasmas formed of hydrogen, water vapor, oxygen and nitrogen were not particularly effective. The sterilizing gas used may differ with the type or types of microorganism to be destroyed. It may therefore be defined as a gas capable of being ionized at low pressures to form ions which are able to destroy a specific microorganism.

By the method and apparatus of this invention it is possible to sterilize surfaces which cannot be processed by such techniques as dielectric or induction heating, rapid, high-temperature heating, autoclaving or chemical treatment. The method is particularly suitable for sterilizing plastic or wax surfaces which cannot tolerate intensive heat.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

We claim:

1. A method of sterilizing a surface, characterized by the step of contacting said surface with a low-pressure gaseous plasma containing between about 10 and 90% by weight of a sterilizing gas selected from the group consisting of chlorine, bromine and iodine in ionic form.

2. A method in accordance with claim 1 wherein said plasma pressure ranges between about one and ten mm. of mercury.

3. A method of sterilizing a surface, comprising the steps of
   (a) placing the surface to be sterilized in a fluid-tight chamber;
   (b) evacuating said chamber to a pressure between about one-tenth and ten mm. Hg;
   (c) introducing into the evacuated chamber a quantity of chlorine, bromine or iodine which amounts to between 10 and 90% by weight of the total gas in said chamber;
   (d) establishing an R-F field within said chamber thereby to form chlorine, bromine or iodine ions which destroy any microorganisms present on said surface.

4. A method in accordance with claim 3 wherein said R-F field is established by energizing coils surrounding said chamber.

5. A method in accordance with claim 3 wherein said surface is the inner walls of a container and wherein said R-F field is established by applying an electrical potential between an electrode inserted in said container and an electrode surrounding said container.

6. A method in accordance with claim 3 wherein the frequency of said R-F field ranges between one and ten megacycles.

References Cited

UNITED STATES PATENTS

| | | | |
|---|---|---|---|
| 3,015,745 | 1/1961 | Klein | 313—231 X |
| 3,057,792 | 10/1962 | Fröhlich | 250—49.5 TC |
| 3,057,795 | 10/1962 | Fröhlich | 250—49.5 TC |
| 3,334,035 | 8/1967 | Dews et al. | 21—54 X |
| 3,383,163 | 5/1968 | Menashi | 21—54 |
| 3,418,515 | 12/1968 | Maskell | 313—231 |
| 3,600,126 | 8/1971 | Hellund | 21—54 R |

MORRIS O. WOLK, Primary Examiner

S. MARANTZ, Assistant Examiner

U.S. Cl. X.R.

21—58, 102 R